C. W. BUCKLEY.
MUD SHOE FOR VEHICLE TIRES.
APPLICATION FILED JULY 9, 1917.
1,313,465.
Patented Aug. 19, 1919.
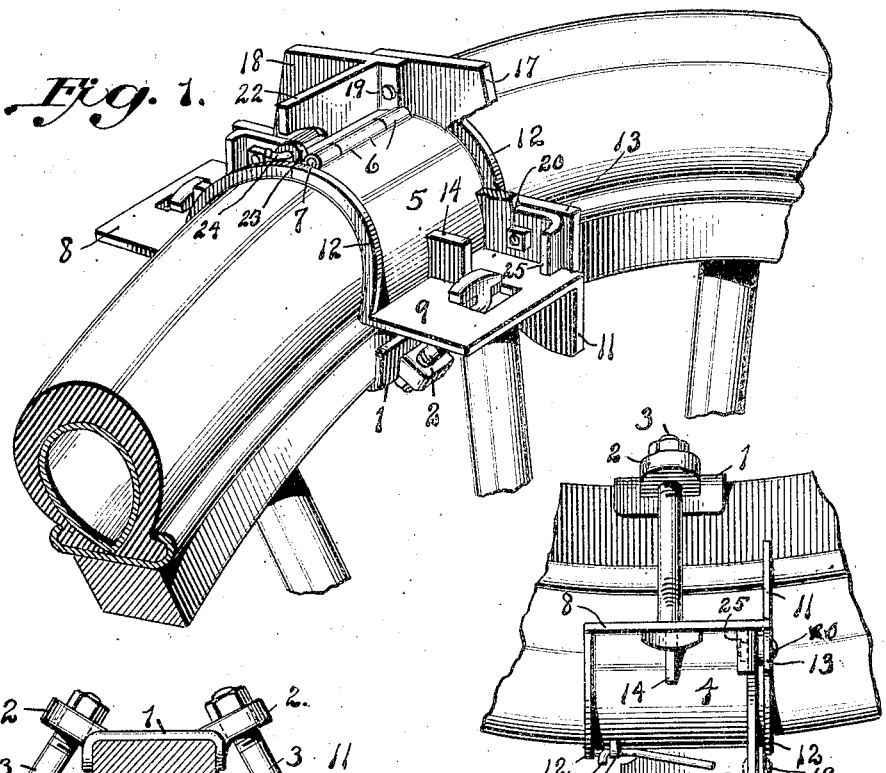
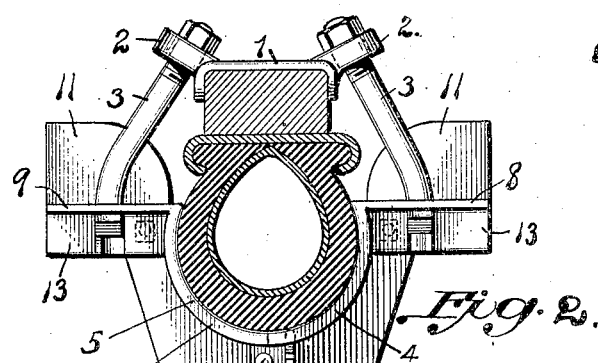
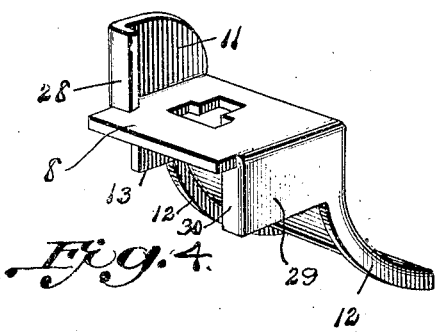
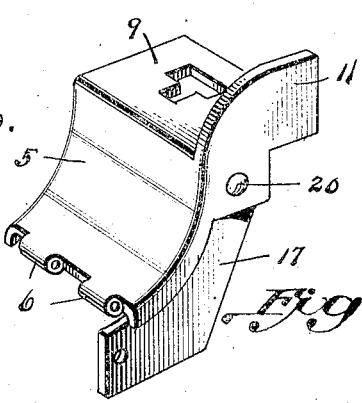
C. W. Buckley,
Inventor.
By Pagelsen and Spence
Attys.

UNITED STATES PATENT OFFICE.

CLAUDE W. BUCKLEY, OF MEMPHIS, TENNESSEE.

MUD-SHOE FOR VEHICLE-TIRES.

1,313,465.　　　　　Specification of Letters Patent.　　Patented Aug. 19, 1919.

Application filed July 9, 1917. Serial No. 179,474.

*To all whom it may concern:*

Be it known that I, CLAUDE W. BUCKLEY, a citizen of the United States, and residing at Memphis, in the county of Shelby and State of Tennessee, have invented a new and Improved Mud-Shoe for Vehicle-Tires, of which the following is a specification.

This invention relates to means adapted to be secured to the wheels of motor vehicles to increase the grip of the tires, and its object is to provide a device of this character which may be readily attached and detached, which will prevent the wheel from sinking into soft ground and will lift the wheel out of ruts because of the great bearing surface of the device, and which may be provided with an auxiliary member so that the effective radially projecting surface may be materially increased when desired.

This invention consists in a novel metal mud shoe formed of a plurality of parts hinged together so that the shoe can be secured to tires of different sizes, and provided with laterally extending bearing plates and radial fins which not only assist in supporting the wheel when passing over soft surfaces but afford greater traction when the vehicle travels through the mud and snow. It further consists in an auxiliary device adapted to be secured to the mud shoe and provided with radial fins of great area which are very effective in lifting mired wheels and preventing them from slipping.

In the accompanying drawing, Figure 1 is a perspective view of a section of an automobile tire with this improved mud shoe secured thereto. Fig. 2 is an end view of the mud shoe. Fig. 3 is a side view thereof secured to a tire. Figs. 4 and 5 are perspectives of parts of slightly modified forms of shoes.

Similar reference characters refer to like parts throughout the several views.

In the operation of motor vehicles, difficulty is often experienced in traveling muddy roads when the weight of the car mires the wheels up to the hubs. The driving wheels slip and no forward movement of the car is obtainable to move the wheels up out of the mire. Any device to assist in lifting the wheels out of the deep ruts in the road must be quickly attachable and detachable for the device which will engage in the mud and press the car forward may cut the tires when solid ground is reached. The device must be such that it can be secured to the exposed portions of the tire after the wheel is deep down in the ruts. It is also desirable to provide the tire with an auxiliary member which renders the device especially adapted for very soft ground and snow.

In the drawings, 1 is a saddle fitting over the felly of the wheel and formed with ears 2 having holes of considerable size to receive the bolts 3 by means of which the shoe is secured in position. The shoe is formed of two parts 4 and 5, curved to fit a selected size of tire, and secured together by means of the sleeves 6 and the pintle 7 so that the mud shoe can be fitted to a tire, being drawn against it by means of the bolts 3 that engage the laterally extending plates 8 and 9. These plates may be formed with holes or slots of any desired shape to receive these bolts, and the size of these plates may be varied through wide limits, and their front edges are preferably turned inwardly to constitute the fins 11. The large holes in the ears 2 permit the bolts to swing and permit the shoe to fit tires of widely different diameters. The metal constituting the two parts 4 and 5 is turned outwardly along its front and rear edges to constitute the stiffening flanges 12, and at the front end of the shoe I prefer to form the laterally extending fins, 13 which, together with the fins 11, strike the mud as they reach the surface of the ground during the turning of the wheels and pack it to such an extent as to constitute abutments of sufficient resisting power to permit the wheel to lift itself out of the rut. The corners formed by the flange 12 and parts 4 and 5 are well rounded so that the shoe will not cut the tire when the wheel runs on hard ground.

If desired, additional fins 14 may be provided at any effective points on the members 4 and 5. The proportions of these various parts may all be varied by those skilled in the art without departing from my invention. This is particularly true of the width of the fins 8, 11 and 13. The plates 8 and fins 11 and 13 are well up on the sides of the tires and will not engage the new types of crown fenders.

The small flanges 12 may be omitted if desired, but as they project down not lower than the sleeves 6 of the hinge between the parts 4 and 5, the action of these flanges cannot be objectionable. In order to obtain an unusually large engaging surface radially of the tire and outside of it, I provide an auxiliary device which may be attached to the tire shoe when in place on the tire or removed therefrom. It consists of two plates 17 and 18, united together by the rivet 19. It may be connected to the tire shoe in any desired manner, the method shown being by means of bolts 20 that extend through proper holes in the fins 13. This auxiliary member may have a rearwardly extending brace 22 connected to the plate 18 that engages one of the members of the shoe and holds the plates radially of the wheel. A small loop or ear 23 may be struck out from the main shoe and a rod 24, secured to or integral with the brace 22, may extend through this ear and so prevent lateral movement of the rear end of this brace. When the wheel turns backward, this rod will hold the plates 17 and 18 in proper position and prevent them from being broken. When the auxiliary member is removed the wheel may run on hard ground without injury to the tire from the shoe.

Any desired plates or fins may be formed with flanges for stiffening purposes such as the flanges 25 on the plates 17 and 18.

If desired, the shoe may be formed directly with integral fins 29 as shown in Fig. 4, of the shape of the fins 17 and 18 of the auxiliary device, and the upright fin 11 may be formed with a lateral flange 28, which fin 29 may also have a flange 30 along its side edge. These flanges not only strengthen the structure but they also retain a certain amount of earth and thus increase the traction effect of the wheel. The details and proportions of the various parts may all be changed without departing from the spirit of my invention set forth in the following claims.

I claim:—

1. A mud shoe for vehicle tires comprising two members hinged together and adapted to fit around the tire, and means to hold said parts in position on the tire, each of said members being formed with flat laterally extending bearing plates and with inwardly and outwardly extending fins at one end of each bearing plate.

2. A mud shoe for vehicle tires comprising two members hinged together and adapted to fit around the tire, and means to hold said parts in position on the tire, each of said members being formed with flat laterally extending bearing plates and with inwardly and outwardly extending fins at one side of each bearing plate, and with marginal flanges at the curved edges of said member, said flanges projecting from the tire.

3. A mud shoe for vehicle tires comprising a section of a cylinder having radial fins at one end, and an auxiliary member detachably mounted on said shoe and comprising two members pivoted together and adapted to fit around the cylindrical portion of the shoe and against the radial fins.

4. A mud shoe for vehicle tires comprising two members in the form of sections of a cylinder hinged together and having radial fins at adjacent ends, an auxiliary member detachably mounted on said shoe and comprising two radial members pivoted together and adapted to fit around the cylindrical portions of the shoe and against the fins thereon, and means to secure said auxiliary member in position.

5. A mud shoe for vehicle tires comprising two members hinged together and fitting the tire and having radial fins at one end and laterally projecting plates at their free edges, an auxiliary bearing member comprising radial plates adapted to be secured to said fins and a longitudinal stiffening member extending along the shoe and connected to one of said plates, means to secure the plates to said fins, and means to secure said stiffening member to the opposite end of said shoe.

CLAUDE W. BUCKLEY.